United States Patent [19]

Poklemba

[11] 4,419,759
[45] Dec. 6, 1983

[54] CONCURRENT CARRIER AND CLOCK SYNCHRONIZATION FOR DATA TRANSMISSION SYSTEM

[75] Inventor: John J. Poklemba, Ijamsville, Md.

[73] Assignee: Communications Satellite Corporation, Washington, D.C.

[21] Appl. No.: 175,479

[22] Filed: Aug. 5, 1980

[51] Int. Cl.³ .............................................. H03L 7/06
[52] U.S. Cl. ...................................... 375/97; 375/81; 375/120; 329/50
[58] Field of Search ...................... 375/39, 77, 97, 80, 375/81, 94, 95, 120; 328/133; 329/50, 100, 122; 455/202–204

[56] References Cited

U.S. PATENT DOCUMENTS

| | | | |
|---|---|---|---|
| 3,701,948 | 10/1972 | McAuliffe | 375/9 X |
| 3,984,778 | 10/1976 | Bhopale | 375/77 |
| 4,085,378 | 4/1978 | Ryan | 375/81 |
| 4,101,844 | 7/1978 | Malone | 375/120 |

*Primary Examiner*—Benedict V. Safourek
*Assistant Examiner*—Stephen Chin
*Attorney, Agent, or Firm*—Sughrue, Mion, Zinn, Macpeak & Seas

[57] ABSTRACT

The present invention is directed to circuitry for achieving concurrent synchronization of carrier phase and clock timing in double-sideband, suppressed carrier transmissions systems. A phase-lock loop (PLL) is used in the respective carrier and clock recovery networks. The carrier recovery loop is similar to the conventional "Costas Loop". The PLLs are cross coupled in an interdependent recovery structure to enable a more effective clock and carrier regeneration.

16 Claims, 6 Drawing Figures

CONCURRENT CARRIER AND CLOCK SYNCHRONIZATION FOR DATA TRANSMISSION SYSTEM

BACKGROUND OF THE INVENTION

This invention relates to a technique for obtaining carrier phase and symbol timing synchronization in a data transmission system, and more particularly to such a technique which is especially useful in data transmission systems operated in the burst mode.

In conventional data transmission systems, for example satellite communications systems, information is transmitted in the form of modulated waveforms, and in order to obtain the transmitted information it is necessary to demodulate the received transmission using a coherent carrier reference signal and a clock signal which is synchronized to the symbol timing of the modulated waveform. The carrier and clock synchronization have conventionally been secured in a number of ways, some of the techniques performing the two synchronizations serially with separate time intervals for each, and some performing the synchronizations in parallel.

A typical series-type carrier and clock recovery system may include a phase-lock-loop (PLL) for the carrier recovery as shown in FIG. 1, and either a differentiation, rectification and phase-lock loop (DRPLL) or digital bit timing recovery (DBTR) for the clock recovery as shown in FIGS. 2 and 3, respectively. In the carrier recovery circuit of FIG. 1, the modulated waveform is supplied to input terminal 10 from which it is supplied as an input to each of mixers 12 and 14. The input signals are then translated to baseband using carrier signals received through a phase-shift circuit 16 from a voltage controlled oscillator (VCO) 18. The output of mixer 12 is supplied to a low pass filter 20 and the data of the output of filter 20 is supplied to the input of comparator 22. Likewise, the output from mixer 14 is supplied through a data filter 26 to the comparator 28.

The data from opposite channels are multiplied in mixers 24 and 30, respectively, and the mixer outputs are differenced in subtractor circuit 32, the output of which is supplied through a loop filter 34 as the control voltage to the VCO 18.

After establishment of a coherent carrier in the carrier recovery circuit of FIG. 1, the data stream can be removed from the received signal and supplied to the input of differentiation circuit 40 in FIG. 2. The differentiated signal is then rectified in rectification circuit 42 and provided as one input to mixer 44 where it is mixed with the output from VCO 46. The mixer output is provided through the loop filter 48 to the voltage control input terminal of VCO 46.

In transmission systems operated in the burst mode, the carrier phase and symbol timing synchronization must be repeatedly derived from each received burst. Thus, a certain amount of "overhead", or surplus signal containing no data, is typically included at the beginning of the burst in order to provide the receiver with sufficient time to derive the carrier phase and symbol timing synchronization prior to receiving the modulated data waveforms. Since the inclusion of this overhead in the burst will necessarily decrease the amount of data which can be included in any given burst, it is desirable to keep the amount of overhead to an absolute minimum. Therefore, the carrier and clock synchronization techniques which are performed in series with separate time intervals for each synchronization are considered undesirable since an excessive amount of time is required for the two synchronizations to be achieved.

Due to the excessive overhead required when series-type carrier and clock synchronization techniques are used in burst-mode data transmission systems, it has been considered generally preferable to employ parallel-type systems in which the two synchronization operations are performed substantially simultaneously. For example, in the remodulation technique of FIG. 3, the received modulated waveform is supplied in parallel to mixers 50 and 52 where it is converted to baseband by in phase and quadrature carriers from phase-shift circuit 54. Bit detectors 56 and 58 are used to provide data bit streams to mixers 60 and 62, respectively. The received waveform is split into in phase and quadrature components in phase shifter 64, and the two components are supplied as the other inputs to mixers 60 and 62. Accordingly, the received waveform is "remodulated" with the data from detectors 56 and 58 to effectively remove the data, and the two remodulated waveforms are then combined in summation circuit 66. The output of summation circuit 66 is provided through a bandpass filter 68 to threshold comparator 70, and the carrier present at the output of threshold detector 70 is supplied back to the phase shift circuitry 54.

In the "X4" carrier recovery circuit of FIG. 4, the received signal is supplied to a fourth-power circuit 80, the output of which includes a component at four times the carrier frequency f. The output of fourth-power circuit 80 is supplied through a band pass filter 82 to a threshold comparator 84, the output of threshold comparator 84 being a digital signal at four times the carrier frequency. This signal is then supplied through a divide-by-four circuit 86 to obtain a coherent carrier.

In a parallel-type carrier and clock synchronization technique, both the carrier and clock must be derived from the received signal, as opposed to the series-type systems in which the carrier is derived from the received signal and is then used to isolate the data from which the clock signal is generated. Accordingly, in FIG. 5, the received signal is supplied directly to one input of mixer 90 and to the other input of mixer 90 through a delay of T/2, where T=1/R, and R is the symbol rate. The output of mixer 92 is provided through a bandpass filter 94 to a threshold detector 96, the output of which constitutes the recovered clock.

Two primary criteria for judging the performance of any synchronization technique are the acquistion speed and steady state performance. As described above, the acquisition speed of series-type carrier and clock synchronization techniques have generally been considered unacceptable for data transmission systems operated in the burst mode. For a number of additional reasons, none of the above-described parallel-type synchronization techniques have proven entirely satisfactory. Concerning the X4 network shown in FIG. 4, the fourth-power circuit 80 results in an inherent loss of 12 dB in S/N. As a result, its mean acquisition time, steady state phase jitter and error rate performance are correspondingly degraded.

In a manner analogous to the X4 carrier recovery technique, the clock synchronization circuitry of FIG. 5 in which clock synchronization is obtained through half symbol delay and squaring also results in an inherent decrease in the S/N, with corresponding decreases in performance.

For carrier recovery alone, the remodulation network shown in FIG. 3 has shown the best overall performance to date, but its feedback structure does not utilize the best estimates possible to remove the data modulation from the carrier. In particular, during the synchronization period, or preamble, the data sequence is known and need not be estimated, whereas the remodulation technique of FIG. 3 utilizes bit detectors 56 and 58 to provide estimated bit streams to the remodulation mixers 60 and 62.

In addition, in all of these techniques, the noise present in the received signal is aggravated by non-linear signal processing, making it more difficult to obtain stable carrier and clock estimates.

A further deficiency of the above-described systems is that burst mode control signals such as acquisition detection, loss of lock and end of burst, which possess a minimum degree of uncertainty, are not readily derived from these structures.

SUMMARY OF THE INVENTION

It is an object of this invention to provide a carrier and clock synchronization technique in which carrier and clock synchronization are obtained substantially simultaneously.

It is a further object of this invention to provide such a synchronization technique having improved mean acquisition time, stead state phase jitter and error rate performance.

It is a still further object of this invention to provide such a synchronization technique in which the problem of false lock at offset frequencies which are a sub-multiples of the bit rate is substantially eliminated and from which burst mode control signals such as acquisition, loss of lock and end of burst can easily be obtained.

Briefly, these and other objects are achieved by a carrier phase and symbol timing synchronization technique according to the present invention in which two phase-lock-loops (PLL's) are used and are coupled together to result in an interdependent recovery structure. Sampling is used to obtain substantially noise-free data estimates which may be used for modulation removal. Further, in both the carrier and clock recovery networks, a known bit sequence can be provided for modulation removal and phase comparison during the preamble, and the best possible bit estimates are used after the preamble. By cross coupling the PLL's, the clock recovery network can take advantage of coherency developed in the carrier recovery loop to better facilitate clock regeneration.

BRIEF DESCRIPTION OF THE DRAWINGS

The invention will be more clearly understood with reference to the following description in conjunction with the accompanying drawings in which.

DETAILED DESCRIPTION OF THE INVENTION

The present invention will now be described in the context of recovering carrier and clock information from a received signal of the form $$r(t) = \sum_{i=1}^{N} a_i(t - iT) \cos(\omega t) + b_i(t - iT) \sin(\omega t)$$

where the modulating waveforms $a_i(t)$ and $b_i(t)$ are each representative of filtered bipolar binary data. Thus, there are four possible signals which can be sent over any time interval T, and the entire data sequence is of length N. It should be noted that the invention is not intended to be limited to use only with quarternary signals, but by setting $a_i(t)$ or $b_i(t)$ to zero, the system degenerates readily to a binary transmission system. It is also possible to extend the synchronization system according to the present invention to any M-ary signal set.

Figure 6:
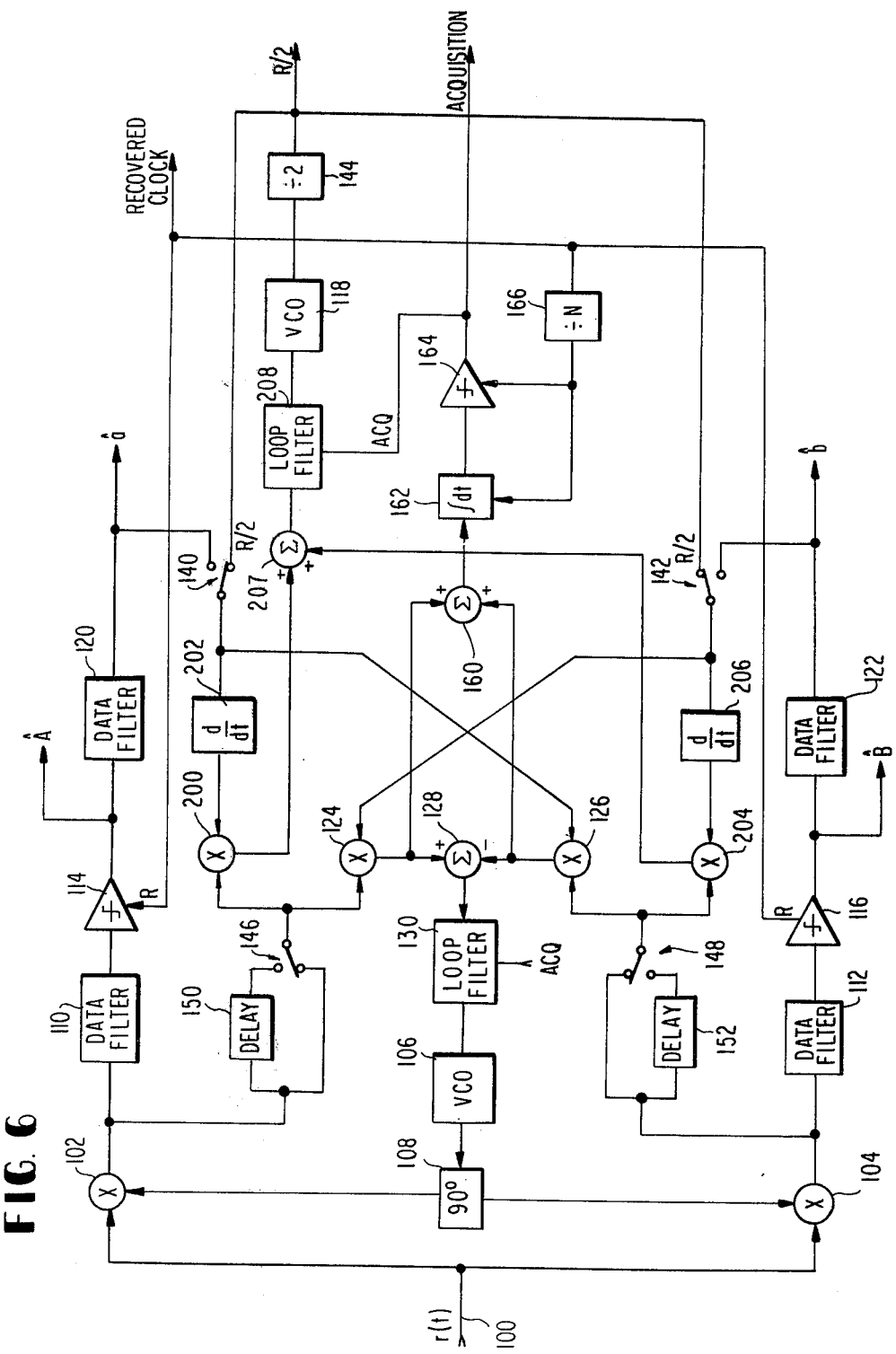
FIG. 6 is a block diagram of a carrier and clock synchronization network according to the present invention.

A carrier and clock recovery network according to the present invention is shown in FIG. 6. For carrier synchronization, the PPL is similar to a conventional "Costas Loop" with decision directed feedback. A double side band suppressed carrier signal is injected at the input terminal 100 and is supplied in parallel to mixers 102 and 104. A carrier signal from VCO 106 is supplied through a 90 degree phase shift circuit to the other inputs of mixers 102 and 104 so that both the in phase and quadrature components of the received signal are translated to baseband and the signal at the output of each mixer includes components from both data streams modulated a phase error. At the outputs of the mixers, the signal in the carrier synchronization loop is split into two paths. In the first path, the baseband signals are provided through lowpass filters 110 and 112 to sampled comparators 114 and 116, respectively. The comparators are sampled with the clock signal from VCO 118 in the clock synchronization portion of the network, to be described in more detail below. The outputs of the sampled comparators 114 and 116 are quantized matched filter data estimates $\hat{A}$ and $\hat{B}$, and these data estimates are supplied through filters 120 and 122 to produce their analog counterparts $\hat{a}$ and $\hat{b}$, respectively.

In the other signal path of the carrier synchronization loop, the baseband signals at the outputs of mixers 102 and 104 are each provided to mixers 124 and 126, respectively. The baseband signal provided by mixer 102 is multiplied in mixer 124 by the analog bit estimates $\hat{b}$, and the baseband signal at the output of mixer 104 is multiplied in mixer 126 by the analog bit estimates $\hat{a}$ from the opposite channel. The outputs of these mixers 124 and 126 are then differenced in a subtractor 128 to remove modulation from the incoming carrier. The output of the subtraction circuit 128 is provided through a loop filter 130 to the control terminal of VCO 106. The output of loop filter 130 will appropriately adjust the phase of VCO 106 until it phase-locks onto the center frequency of the input signal r(t).

Figure 1:
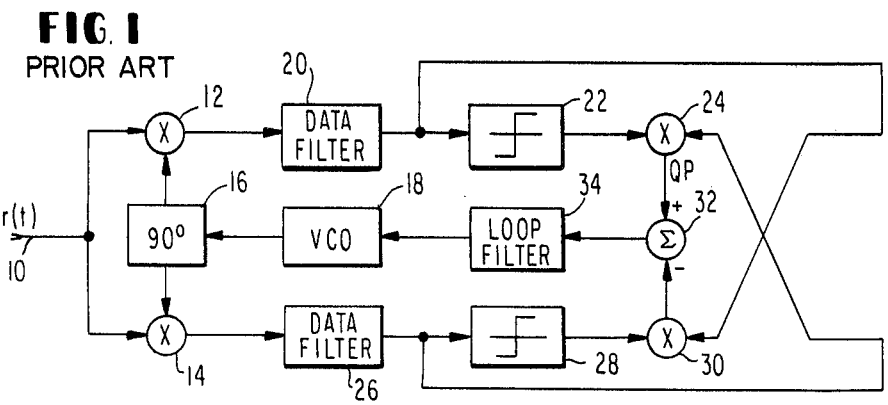
FIG. 1 is a brief diagram of a known phase-lock-loop (PLL) carrier recovery network.
Figure 2:
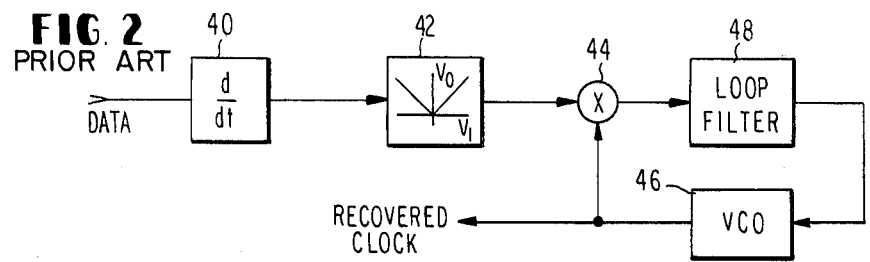
FIG. 2 is a brief diagram of a known differentiation, rectification and phase-lock-loop (DRPLL) clock recovery network.
Figure 3:
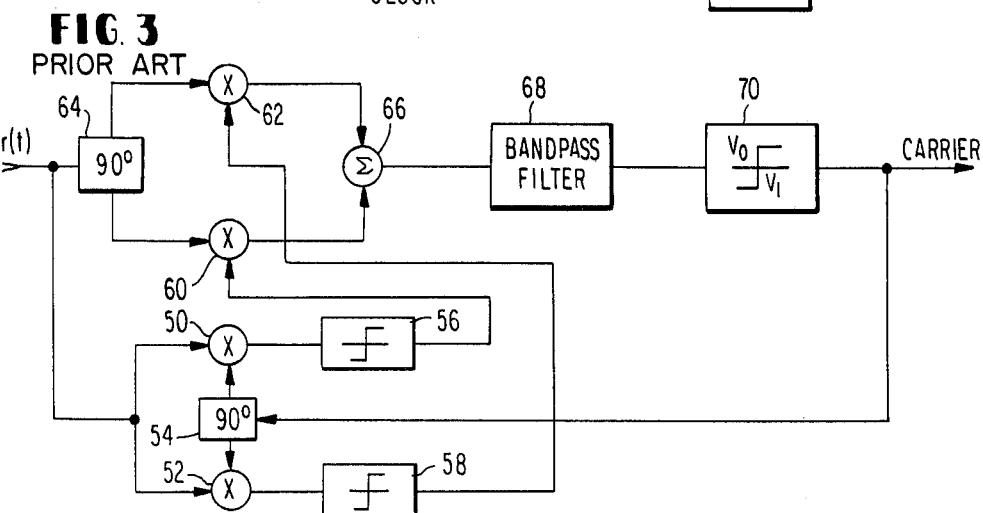
FIG. 3 is a brief diagram of a known remodulation-type carrier recovery network.
Figure 4:
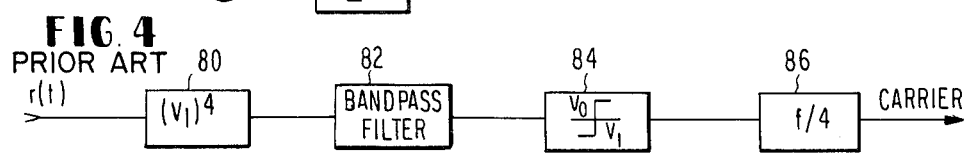
FIG. 4 is a brief diagram of a known X4 carrier recovery network.
Figure 5:
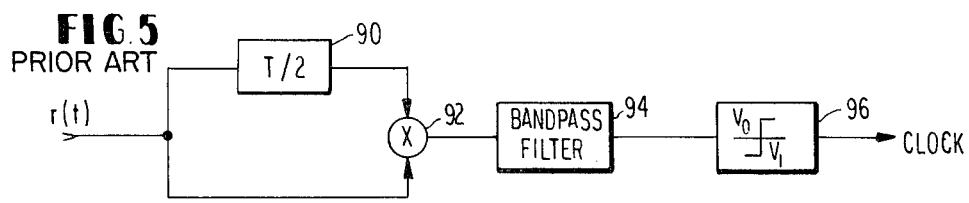
FIG. 5 is a brief diagram of a known clock recovery network utilizing half symbol delay and squaring.

A significant distinction between the above-described carrier synchronization loop and conventional carrier synchronization loops resides in the nature of the data estimates being fed back for modulation removal. During the synchronization interval, or preamble, a known sequence such as "1010..." may be used, followed by an unknown data pattern over the message cycle. After filtering, this "1010..." known sequence degenerates into a sine wave and, therefore, it is a simple matter to provide the bit estimates during the preamble from a VCO. Accordingly, during the preamble the switches 140 and 142 are in the position shown in FIG. 3 so that the "1010..." data estimates can be provided from the VCO 118 through the divide-by-two circuit 144 in the clock recovery loop, to be described later. Similarly, during the preamble the switches 146 and 148 are maintained in the position shown in FIG. 6 so that the output of mixers 102 and 104 will be provided directly to the inputs of mixers 124 and 126, respectively.

At the end of the preamble, the data is unknown, and must be detected and fed back in order to achieve modulation removal for carrier recovery. Accordingly, before the end of the preamble the switches 140 and 142 are changed to their alternate positions from those shown in FIG. 6 so that the analog bit estimates â and b̂ are supplied to the mixers 126 and 124, respectively. These estimates are substantially noise-free due to the sampling operation. Also, since the operation of the matched filters requires some finite amount of time in order to generate the data estimates at the outputs of filters 120 and 122, delays 150 and 152 are switched into the second paths of the carrier synchronization loop at this time. It may also be desirable to change the characteristics of loop filter 130 at the end of the preamble in order to optimize for both acquisition and steady state performance.

The switches 140, 142, 146 and 148 may all be ganged together and operated by a common signal, with the same signal being supplied to a control input terminal of filter 130 in order to alter the filter response thereof. This control signal is preferably an acquisition signal which is generated whenever the degree of carrier synchronization is within prescribed limits. The acquisition signal is generated by combining the outputs of carrier loop multipliers 124 and 126 in a summation circuit 160, integrating in integration circuit 162 and passing the integrated signal through a sampled bipolar threshold comparator 164. The sampling signal is generated by passing the output of VCO 118 through a divide-by-N circuit 166 so that the sampling signal at comparator 164 is some integer sub-multiple of the recovered clock signal. The degree of reliability desired, such as the probability of false or missdetection at some S/N will determine the length of the integration time for integrator 162. It should be noted, however, that as the length of this interval increases, more uncertainty will exist as to the precise time at which acquisition commences or terminates.

The operation of the clock synchronization loop of the present invention is substantially similar to that of the above-described carrier synchronization. However, rather than mixing the base band signal from the output of mixer 102 in multiplier 124 with the estimated analog bit stream b̂, it is multiplied in multiplier 200 with the time derivative of the analog bit stream â as supplied from differentiation circuit 202. Similarly, the output of mixer 104 is multiplied in multiplier 204 with the time derivative of the analog bit stream b̂ as supplied through differentiation circuit 206. As in the carrier synchronization loop, the switches 140, 142, 146 and 148 may all be ganged together and/or operated by a common control signal, preferably the acquisition signal at the output of sampled comparator 164.

The output of summation circuit 207 is provided through a loop filter 208 to the control terminal of VCO 118. The output of loop filter 208 will indicate the degree of synchronization between the VCO output and the incoming data bit rate. As in the carrier synchronization loop, the acquisition signal at the output of sampled comparator 164 is applied to a control terminal of loop filter 208 in order to alter the filter response between the preamble and the message cycle of the burst.

In the above description, the carrier and clock recovery loops have been discussed separately, but it should be emphasized that a significant feature of the invention is their interdependent operation in which the performance of each is augmented by the estimate developed in the other. For example, the recovered clock is used to sample each of comparators 114 and 116, thus enhancing the bit estimates fed back during the message portion of the burst for both carrier and clock recovery purposes. Further, since a substantial portion of the clock and carrier recovery loops are common to one another, the clock recovery network can benefit from the coherency developed in the carrier loop.

Significant advantages of the circuit structure according to the present invention are that the estimation of carrier and clock timing are performed in parallel so that only a single interval must be allocated for acquisition, thus making the present invention highly useful in the context of burst mode data transmission systems. Further, the coherent references derived from each synchronization loop are coupled together to further expedite synchronization. Noise injected at the input of the synchronization circuit is eliminated by sampling and will not pass through any nonlinearity which may cause degradation of the S/N ratio. A further significant advantage is that the data estimates fed back for modulation removal in both the carrier and clock recovery networks are the best available estimates. More specifically, during the acquisition period, or preamble, a known sequence is utilized in which the only uncertainty involved is that of the bit timing. After synchronization is detected, the matched filter estimates of the data sequences are then used, since they are the best estimates obtainable when the data pattern is unknown.

As a result of these various features and advantages, the synchronization circuitry according to the present invention will provide a better mean acquisition time, steady state phase jitter and error rate performance than conventional synchronization circuits. Further, since the data is removed from the carrier, the problem of false lock at offset frequencies which are sub-multiples of the bit rate is substantially eliminated.

Finally, the acquisition signal at the output of sampled comparator 164 also provides a continuously updated indication of lock during the entire burst. If an "end of burst" notification is necessary, it can be triggered off the trailing edge of the acquisition signal. Thus, indications such as acquisition, loss of lock and end of burst are easily procured at little or no increase in circuit complexity.

It should be appreciated that there are various possibilities for implementing the various system blocks disclosed above, all of which possibilities fall within the scope of the present invention. Without limitation, some examples of circuit details which could be used to implement the present invention are as follows. First, the delay networks could be implemented by using all-pass filter sections, charge coupled devices, etc. Further, switching could be accomplished either softly or abruptly, and the VCO's can be analog or digital or could even operate at some multiple of the intended frequency in order to provide coherent references at other rates. A still further possibility which may reduce the complexity at a slight penalty in performance would be to utilize the quantized data estimates $\hat{A}$ and $\hat{B}$ in the feedback structure rather than their analog counterparts $\hat{a}$ and $\hat{b}$. In this instance, some modification to the differentiator may also be necessary.

What is claimed is:

1. In an apparatus for deriving concurrent carrier and clock synchronization from a received signal, said received signal including at least a first carrier modulated with at least a first data signal, said apparatus including:
   (a) a carrier recovery network for providing an estimated carrier signal comprising:
   first mixing means for mixing said received signal with said estimated carrier signal and providing a first mixing means output;
   data recovery means for sampling and comparing said first mixing means output to obtain an estimate of said at least first data signal;
   second mixing means for combining said first mixing means output and said at least first data signal estimate and providing a carrier phase error signal as an output; and
   first voltage controlled oscillator means for providing said estimated carrier signal in accordance with said carrier phase error signal; and
   (b) a clock recovery network comprising:
   differentiating means for receiving said at least first data signal estimate and providing as an output the time derivative thereof;
   third mixing means for combining the outputs of said differentiating means and said first mixing means to obtain a clock phase error signal; and
   second voltage controlled oscillator means providing said estimated clock signal in accordance with said clock phase error signal, said estimated clock signal being provided as a sampling signal to said data recovery means.

2. An apparatus according to claim 1, wherein said received signal includes a preamble portion, said apparatus further comprising known data estimate generation means for providing known data estimates to said differentiating means and second mixing means during the preamble portion of said received signal, whereby said second mixing means combines the outputs of said first mixing means and said known data estimate generation means and said differentiating means provide the time derivative of said known data estimates during said preamble.

3. An apparatus as defined in claim 2, further comprising a first switching means for selectively providing one of two inputs as an output in response to a switch control signal, said first switching means having its output coupled to said differentiating means and second mixing means and having its two inputs coupled to the outputs of said data recovery means and known data estimate generation means, respectively.

4. An apparatus as defined in claim 3, further comprising:
   delay means for receiving and delaying the output of said first mixing means; and
   second switch means for selectively providing one of two inputs as an output in response to a switch control signal, the output of said second switch means being coupled to said second and third mixing means, and the two inputs of said second switch means being coupled to the outputs of said first mixing means and said delay means, respectively.

5. An apparatus as defined in claim 4, wherein said switch control signal is an acquisition signal indicating that a desired degree of carrier synchronization has been achieved.

6. An apparatus as defined in claim 5, wherein said acquisition signal is generated by an acquisition signal generating means comprising:
   divide-by-N means for receiving and dividing said estimated clock signal and providing an acquisition sampling signal output;
   integration means for receiving and integrating the output of said second mixing means over an integration period determined by said acquisition sampling signal; and
   bipolar sampled comparator means clocked by said acquisition sampling signal for receiving, sampling and comparing the output of said integration means, the output of said bipolar sampled comparator means comprising said acquisition signal.

7. An apparatus as defined in claim 2, wherein said received signal includes phase and quadrature carriers modulated with first and second data signals, respectively, wherein:
   said first mixing means comprises first and second mixers each receiving said received signal at one input; and phase shift means for receiving said estimated carrier from said first voltage controlled oscillator means and providing phase and quadrature estimated carriers to the other inputs of said first and second mixers, respectively;
   said data recovery means includes a first sampled comparator clocked by said estimated clock for recovering a first data signal estimate from the output of said first mixer, and a second sampled comparator clocked by said estimated clock for recovering a second data signal estimate from the output of said second mixer; and
   said second mixing means comprises a third mixer for combining said second data signal estimate and said first mixer output, a fourth mixer for mixing said first data signal estimate with said second mixer output, and first combining means for combining said third and fourth mixer outputs to obtain said carrier phase error signal.

8. An apparatus as defined in claim 7, wherein: said differentiating means comprises a first differentiator for providing as an output the time derivative of said first data signal estimate, and a second differentiator for providing as an output the time derivative of said second data signal estimate;
   said third mixing means comprises a fifth mixer for combining the outputs of said first mixer and first differentiator, a sixth mixer for combining the outputs of said second mixer and second differentiator, and second combining means for combining the outputs of said fifth and sixth mixers to obtain said clock phase error signal.

9. An apparatus as defined in claim 8, wherein:
   said first switching means comprises a first switch having said first data signal estimate coupled to its first input, said known data estimate coupled to its second input, and its output coupled to said first differentiator and fourth mixer; and
   a second switch having its first input coupled to said second data signal estimate, its second input coupled to said known data signal estimate and its output coupled to said second differentiator and third mixer;

said delay means comprises a first delay having its input coupled to the output of said first mixer and a second delay having its input coupled to the output of said second mixer;

said second switching means comprises a third switch having its first input coupled to the output of said first mixer, its second input coupled to the output of said first delay and its output coupled to said third and fifth mixers; and a fourth switch having its first input coupled to the output of said second mixer, its second input coupled to the output of said second delay and its output coupled to said fourth and sixth mixers; and all of said switches operating together to pass either their first or second inputs in accordance with sa said acquisition signal.

10. An apparatus as defined in claim 1, wherein said data recovery means includes sampled comparator means clocked by said estimated clock signal, and a low pass data filter coupled between said first mixing means output and said sampled comparator.

11. An apparatus as defined in claim 10, wherein said data recovery means further includes analog filter means at the output of said sampled comparator means for converting the output of said sampled comparator means to an analog data estimate.

12. An apparatus as defined in claim 7, wherein said known data estimate generation means comprises a divide-by-two means for receiving said estimated clock as its input and providing said known data estimate as its output.

13. An apparatus as defined in claim 7, wherein said first combining means is a subtractor.

14. An apparatus as defined in claim 8, wherein said second combining means is an adder.

15. An apparatus as defined in claim 4, wherein said first voltage controlled oscillator means includes a first voltage controlled oscillator and a first controlled signal filter, said first control signal filter receiving the output of said second mixing means and providing a filtered controlled signal to said first voltage controlled oscillator means, and said second voltage controlled oscillator means includes a second voltage controlled oscillator and a second control signal filter, said second control signal filter receiving the output of said third mixing means and providing a filtered control signal to said second voltage controlled oscillator.

16. An apparatus as defined in claim 15, wherein said first and second control signal filters each exhibit first and second filter responses in accordance with a filter response control signal, said first and second control signal filters receiving said switch control signal as their filter response control signals.

* * * * *

UNITED STATES PATENT AND TRADEMARK OFFICE
CERTIFICATE OF CORRECTION

PATENT NO. : 4,419,759

DATED : December 6, 1983

INVENTOR(S) : John J. Poklemba

It is certified that error appears in the above-identified patent and that said Letters Patent is hereby corrected as shown below:

Column 3, line 30, before "state", change "stead" to --steady--.

Column 4, line 27, after "the", change "PPL" to --PLL--;

line 37, after "modulated" insert --by--.

Column 7, line 9, before "necessary", change "may also be" to --is--;

line 50, after "means", change "provide" to --provides--; after "provides", insert --a signal representative of--.

UNITED STATES PATENT AND TRADEMARK OFFICE
CERTIFICATE OF CORRECTION

PATENT NO. : 4,419,759
DATED : December 6, 1983
INVENTOR(S) : John J. Poklemba

It is certified that error appears in the above-identified patent and that said Letters Patent is hereby corrected as shown below:

Column 8, line 52, after "output", insert --a signal representing--.

Column 9, line 20, after "with", delete "sa".

Column 10, line 14, after "first", change "controlled" to --control--.

Signed and Sealed this

Tenth Day of July 1984

[SEAL]

Attest:

Attesting Officer

GERALD J. MOSSINGHOFF

Commissioner of Patents and Trademarks